US012002480B2

(12) United States Patent
Breebaart et al.

(10) Patent No.: US 12,002,480 B2
(45) **Date of Patent: *Jun. 4, 2024**

(54) AUDIO DECODER AND DECODING METHOD

(71) Applicants: Dolby Laboratories Licensing Corporation, San Francisco, CA (US); Dolby International AB, Dublin (IE)

(72) Inventors: Dirk Jeroen Breebaart, Ultimo (AU); David Matthew Cooper, Carlton (AU); Leif Jonas Samuelsson, Sundbyberg (SE)

(73) Assignees: Dolby Laboratories Licensing Corporation, San Francisco, CA (US); Dolby International AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,769

(22) Filed: Jul. 13, 2023

(65) Prior Publication Data

US 2023/0360659 A1 Nov. 9, 2023

Related U.S. Application Data

(63) Continuation of application No. 17/887,429, filed on Aug. 13, 2022, now Pat. No. 11,705,143, which is a (Continued)

(30) Foreign Application Priority Data

Oct. 8, 2015 (EP) .................................... 15189008

(51) Int. Cl.

| | |
|---|---|
| *G10L 19/02* | (2013.01) |
| *G10L 19/008* | (2013.01) |
| *H04S 7/00* | (2006.01) |

(52) U.S. Cl.
CPC ........ *G10L 19/0212* (2013.01); *G10L 19/008* (2013.01); *G10L 19/0204* (2013.01); (Continued)

(58) Field of Classification Search
USPC .................................................. 704/500–504
See application file for complete search history.

(56) References Cited

U.S. PATENT DOCUMENTS 5,757,931 A 5/1998 Yamada
5,956,674 A 9/1999 Smyth et al.
(Continued)

FOREIGN PATENT DOCUMENTS

CN 1589466 3/2005
CN 101136202 3/2008
(Continued)

OTHER PUBLICATIONS

Bosi, M. et al "ISO/IEC MPEG-2 Advanced Audio Coding" Journal of the Audio Engineering Society, vol. 45, No. 10, Oct. 1997, pp. 789-814.
(Continued)

*Primary Examiner* — Leonard Saint-Cyr

(57) ABSTRACT

A method for representing a second presentation of audio channels or objects as a data stream, the method comprising the steps of: (a) providing a set of base signals, the base signals representing a first presentation of the audio channels or objects; (b) providing a set of transformation parameters, the transformation parameters intended to transform the first presentation into the second presentation; the transformation parameters further being specified for at least two frequency bands and including a set of multi-tap convolution matrix parameters for at least one of the frequency bands.

3 Claims, 10 Drawing Sheets

Related U.S. Application Data continuation of application No. 16/882,747, filed on May 26, 2020, now Pat. No. 11,423,917, which is a continuation of application No. 15/752,699, filed as application No. PCT/US2016/048233 on Aug. 23, 2016, now Pat. No. 10,672,408.

(60) Provisional application No. 62/209,742, filed on Aug. 25, 2015.

(52) U.S. Cl.
CPC .......... *H04S 7/308* (2013.01); *H04R 2460/03* (2013.01); *H04S 2400/01* (2013.01); *H04S 2420/01* (2013.01); *H04S 2420/03* (2013.01); *H04S 2420/07* (2013.01)

(56) References Cited

U.S. PATENT DOCUMENTS

| | | | | |
|---|---|---|---|---|
| 6,240,380 | B1 | 5/2001 | Malvar | |
| 7,548,852 | B2 | 6/2009 | Den Brinker | |
| 7,720,230 | B2 | 5/2010 | Allamanche | |
| 8,174,415 | B2 | 5/2012 | Tuttle | |
| 8,363,865 | B1 | 1/2013 | Bottum | |
| 8,553,895 | B2 | 10/2013 | Plogsties | |
| 8,583,445 | B2 | 11/2013 | Oh | |
| 8,653,354 | B1 | 2/2014 | Van Buskirk | |
| 8,654,983 | B2 | 2/2014 | Breebaart | |
| 2001/0014159 | A1 | 8/2001 | Masuda | |
| 2008/0319765 | A1 | 12/2008 | Oh et al. | |
| 2011/0054916 | A1 | 3/2011 | Thumpudi | |
| 2011/0125505 | A1 | 5/2011 | Vaillancourt | |
| 2013/0182853 | A1 | 7/2013 | Chang | |
| 2013/0304480 | A1 | 11/2013 | Kuntz et al. | |
| 2013/0343473 | A1 | 12/2013 | Eliaz | |
| 2014/0355766 | A1 | 12/2014 | Morrell | |
| 2014/0355796 | A1 | 12/2014 | Xiang | |
| 2015/0049847 | A1 | 2/2015 | Malkin | |
| 2015/0110292 | A1* | 4/2015 | Nagel | G10L 21/0388 381/98 |
| 2015/0213810 | A1* | 7/2015 | Baeckstroem | G10L 19/107 704/222 |
| 2016/0314803 | A1* | 10/2016 | Stone | G10L 25/03 |

FOREIGN PATENT DOCUMENTS

| | | | |
|---|---|---|---|
| CN | 101379555 | | 3/2009 |
| CN | 101540171 | | 9/2009 |
| CN | 102939628 | | 2/2013 |
| CN | 103380455 | | 10/2013 |
| CN | 103400581 | | 11/2013 |
| CN | 103763037 | | 4/2014 |
| CN | 104145485 | | 11/2014 |
| EP | 1 499 161 | | 1/2005 |
| EP | 2224431 | | 9/2010 |
| EP | 2 658 120 | | 10/2013 |
| JP | 2009-522894 | | 6/2009 |
| JP | 2009-526258 | | 7/2009 |
| JP | 2009536360 | A | 10/2009 |
| JP | 2010-541510 | | 12/2010 |
| JP | 2012505575 | | 3/2012 |
| KR | 2008-0049747 | | 6/2008 |
| KR | 20110082553 | A | 7/2011 |
| WO | 2008/069593 | | 6/2008 |
| WO | 2017/035281 | | 3/2017 |
| WO | 2017035163 | W | 3/2017 |

OTHER PUBLICATIONS

Brandenburg, K. et al "ISO/MPEG-1 Audio: A Generic Standard for Coding of High-Quality Digital Audio" JAES vol. 42, Issue 10, pp. 780-792, Oct. 1994.

Breebaart, J. et al "Parametric Coding of Stereo Audio" EURASIP Journal on Applied Signal Processing, 2005, 1305-1322.

Breebaart, J. et al "Spectral and Spatial Parameter Resolution Requirements for Parametric, Filter-Bank Based HRTF Processing", Journal of the Audio Engineering Society, pp. 126-140, vol. 58, Issue 3, Apr. 3, 2010.

Briand, M. et al "Parametric Coding of Stereo AUDIO Based on Principal Component Analysis" Proc of the 9th International Conference on Digital Audio Effects (DAFX 06), Montreal, Canada, Sep. 18-20, 2006.

Fielder, L. et al "Introduction to Dolby Digital Plus, an Enhancement to the Dolby Digital Coding System" AES presented at the 117th Convention, Oct. 28-31, 2004, San Francisco, CA USA, pp. 1-29.

Herre, J. et al "MPEG Spatial Audio Object Coding—The ISO/MPEG Standard for Efficient Coding of Interactive Audio Scenes" JAES vol. 60 Issue 9, pp. 655-673, Oct. 9, 2012.

Herre, J. et al "MPEG Surround—The ISO/MPEG Standard for Efficient and Compatible Multichannel Audio Coding" Journal of the Audio Engineering Society, pp. 932-955, vol. 56, No. 11, Nov. 2008.

Schuijers, E. et al "Low Complexity Parametric Stereo Coding" AES 116, May 8-11, 2011, Berlin, Germany, pp. 1-11.

Se-Woon, J. et al "Robust Representation of Spatial Sound in Stereo-to-Multichannel Upmix" AES, presented at the 128th Convention, May 22-25, 2010, London, UK, pp. May 1, 2010, pp. 1-8.

Wightman, F. et al "Headphone Simulation of Free-Field Listening. I:Stimulus Synthesis" J. Acoust. Soc. Am. 85, No. 2, Feb. 1989, pp. 858-867.

Zwicker, E. "Subdivision of the Audible Frequency Range into Critical Bands (Frequenzgruppen)", The Journal of the Acoustical Society of America, vol. 3, No. 2, Feb. 1961, pp. 248.

* cited by examiner

AUDIO DECODER AND DECODING METHOD

CROSS-REFERENCE TO RELATED APPLICATION

This application is a continuation of U.S. patent application Ser. No. 17/887,429, filed Aug. 13, 2022, which is a continuation of U.S. patent application Ser. No. 16/882,747, filed May 26, 2020, now issued as U.S. Pat. No. 11,423,917, on Aug. 23, 2022, which is a continuation of U.S. patent application Ser. No. 15/752,699, filed Feb. 14, 2018, now issued as U.S. Pat. No. 10,672,408, on Jun. 2, 2020, which is U.S. national phase of PCT/US2016/048233, filed Aug. 23, 2016, which claims the benefit of U.S. Provisional Application No. 62/209,742, filed Aug. 25, 2015, and European Patent Application No. 15189008.4, filed Oct. 8, 2015, each of which is hereby incorporated by reference in its entirety.

FIELD OF THE INVENTION

The present invention relates to the field of signal processing, and, in particular, discloses a system for the efficient transmission of audio signals having spatialization components.

BACKGROUND OF THE INVENTION

Any discussion of the background art throughout the specification should in no way be considered as an admission that such art is widely known or forms part of common general knowledge in the field.

Content creation, coding, distribution and reproduction of audio are traditionally performed in a channel based format, that is, one specific target playback system is envisioned for content throughout the content ecosystem. Examples of such target playback systems audio formats are mono, stereo, 5.1, 7.1, and the like.

If content is to be reproduced on a different playback system than the intended one, a downmixing or upmixing process can be applied. For example, 5.1 content can be reproduced over a stereo playback system by employing specific downmix equations. Another example is playback of stereo encoded content over a 7.1 speaker setup, which may comprise a so-called upmixing process, that could or could not be guided by information present in the stereo signal. A system capable of upmixing is Dolby Pro Logic from Dolby Laboratories Inc (Roger Dressler, “Dolby Pro Logic Surround Decoder, Principles of Operation”, www.Dolby.com).

When stereo or multi-channel content is to be reproduced over headphones, it is often desirable to simulate a multi-channel speaker setup by means of head-related impulse responses (HRIRs), or binaural room impulse responses (BRIRs), which simulate the acoustical pathway from each loudspeaker to the ear drums, in an anechoic or echoic (simulated) environment, respectively. In particular, audio signals can be convolved with HRIRs or BRIRs to re-instate inter-aural level differences (ILDs), inter-aural time differences (ITDs) and spectral cues that allow the listener to determine the location of each individual channel. The simulation of an acoustic environment (reverberation) also helps to achieve a certain perceived distance.

Sound Source Localization and Virtual Speaker Simulation

When stereo, multi-channel or object-based content is to be reproduced over headphones, it is often desirable to simulate a multi-channel speaker setup or a set of discrete virtual acoustic objects by means of convolution with head-related impulse responses (HRIRs), or binaural room impulse responses (BRIRs), which simulate the acoustical pathway from each loudspeaker to the ear drums, in an anechoic or echoic (simulated) environment, respectively.

In particular, audio signals are convolved with HRIRs or BRIRs to re-instate inter-aural level differences (ILDs), inter-aural time differences (ITDs) and spectral cues that allow the listener to determine the location of each individual channel or object. The simulation of an acoustic environment (early reflections and late reverberation) helps to achieve a certain perceived distance.

Turning to FIG. 1, there is illustrated 10, a schematic overview is of the processing flow for rendering two object or channel signals $x_i$ 13, 11, being read out of a content store 12 for processing by 4 HRIRs e.g. 14. The HRIR outputs are then summed 15, 16, for each channel signal, so as to produce headphone speaker outputs for playback to a listener via headphones 18. The basic principle of HRIRs is, for example, explained in Wightman et al (1989).

The HRIR/BRIR convolution approach comes with several drawbacks, one of them being the substantial amount of processing that is required for headphone playback. The HRIR or BRIR convolution needs to be applied for every input object or channel separately, and hence complexity typically grows linearly with the number of channels or objects. As headphones are typically used in conjunction with battery-powered portable devices, a high computational complexity is not desirable as it will substantially shorten battery life. Moreover, with the introduction of object-based audio content, which may comprise of more than 100 objects active simultaneously, the complexity of HRIR convolution can be substantially higher than for traditional channel-based content.

Parametric Coding Techniques

Computational complexity is not the only problem for delivery of channel or object-based content within an ecosystem involving content authoring, distribution and reproduction. In many practical situations, and for mobile applications especially, the data rate available for content delivery is severely constrained. Consumers, broadcasters and content providers have been delivering stereo (two-channel) audio content using lossy perceptual audio codecs with typical bit rates between 48 and 192 kbits/s. These conventional channel-based audio codecs, such as MPEG-1 layer 3 (Brandenberg et al., 1994), MPEG AAC (Bosi et al., 1997) and Dolby Digital (Andersen et al., 2004) have a bit rate that scales approximately linearly with the number of channels. As a result, delivery of tens or even hundreds of objects results in bit rates that are impractical or even unavailable for consumer delivery purposes.

To allow delivery of complex, object-based content at bit rates that are comparable to the bit rate required for stereo content delivery using conventional perceptual audio codecs, so-called parametric methods have been subject to research and development over the last decade. These parametric methods allow reconstruction of a large number of channels or objects from a relatively low number of base signals. These base signals can be conveyed from sender to receiver using conventional audio codecs, augmented with additional (parametric) information to allow reconstruction of the original objects or channels. Examples of such techniques are Parametric Stereo (Schuijers et al., 2004), MPEG Surround (Herre et al., 2008), and MPEG Spatial Audio Object Coding (Herre et al., 2012).

An important aspect of techniques such as Parametric Stereo and MPEG Surround is that these methods aim at a parametric reconstruction of a single, pre-determined presentation (e.g., stereo loudspeakers in Parametric Stereo, and 5.1 loudspeakers in MPEG Surround). In the case of MPEG Surround, a headphone virtualizer can be integrated in the decoder that generates a virtual 5.1 loudspeaker setup for headphones, in which the virtual 5.1 speakers correspond to the 5.1 loudspeaker setup for loudspeaker playback. Consequently, these presentations are not independent in that the headphone presentation represents the same (virtual) loudspeaker layout as the loudspeaker presentation. MPEG Spatial Audio Object Coding, on the other hand, aims at reconstruction of objects that require subsequent rendering.

Turning now to FIG. 2, there will be described in overview, a parametric system 20 supporting channels and objects. The system is divided into encoder 21 and decoder 22 portions. The encoder 21 receives channels and objects 23 as inputs, and generates a down mix 24 with a limited number of base signals. Additionally, a series of object/channel reconstruction parameters 25 are computed. A signal encoder 26 encodes the base signals from downmixer 24, and includes the computed parameters 25, as well as object metadata 27 indicating how objects should be rendered in the resulting bit stream.

The decoder 22 first decodes 29 the base signals, followed by channel and/or object reconstruction 30 with the help of the transmitted reconstruction parameters 31. The resulting signals can be reproduced directly (if these are channels) or can be rendered 32 (if these are objects). For the latter, each reconstructed object signal is rendered according to its associated object metadata 33. One example of such metadata is a position vector (for example an x, y, and z coordinate of the object in a 3-dimensional coordinate system).

Decoder Matrixing

Object and/or channel reconstruction 30 can be achieved by time and frequency-varying matrix operations. If the decoded base signals 35 are denoted by $z_s[n]$, with s the base signal index, and n the sample index, the first step typically comprises transformation of the base signals by means of a transform or filter bank.

A wide variety of transforms and filter banks can be used, such as a Discrete Fourier Transform (DFT), a Modified Discrete Cosine Transform (MDCT), or a Quadrature Mirror Filter (QMF) bank. The output of such transform or filter bank is denoted by $Z_s[k, b]$ with b the sub-band or spectral index, and k the frame, slot or sub-band time or sample index.

In most cases, the sub-bands or spectral indices are mapped to a smaller set of parameter bands p that share common object/channel reconstruction parameters. This can be denoted by $b \in B(p)$. In other words, B(p) represents a set of consecutive sub bands b that belong to parameter band index p. Conversely, p(b) refers to the parameter band index p that sub band b was mapped to. The sub-band or transform-domain reconstructed channels or objects $\hat{Y}_j$ are then obtained by matrixing signals $Z_i$ with matrices M[p(b)]:

$$\begin{bmatrix} \hat{Y}_1[k,b] \\ \vdots \\ \hat{Y}_J[k,b] \end{bmatrix} = M[p(b)] \begin{bmatrix} Z_1[k,b] \\ \vdots \\ Z_S[k,b] \end{bmatrix}$$

The time-domain reconstructed channel and/or object signals $y_j[n]$ are subsequently obtained by an inverse transform, or synthesis filter bank.

The above process is typically applied to a certain limited range of sub-band samples, slots or frames k. In other words, the matrices M[p(b)] are typically updated/modified over time. For simplicity of notation, these updates are not denoted here. However, it is considered that the processing of a set of samples k associated with a matrix M[p(b)] can be a time variant process.

In some cases, in which the number of reconstructed signals J is significantly larger than the number of base signals S, it is often helpful to use optional decorrelator outputs $D_m[k, b]$ operating on one or more base signals that can be included in the reconstructed output signals:

$$\begin{bmatrix} \hat{Y}_1[k,b] \\ \vdots \\ \hat{Y}_J[k,b] \end{bmatrix} = M[p(b)] \begin{bmatrix} Z_1[k,b] \\ \vdots \\ Z_S[k,b] \\ D_1[k,b] \\ \vdots \\ D_M[k,b] \end{bmatrix}$$

FIG. 3 illustrates schematically one form of channel or object reconstruction unit 30 of FIG. 2 in more detail. The input signals 35 are first processed by analysis filter banks 41, followed by optional decorrelation (D1, D2) 44 and matrixing 42, and a synthesis filter bank 43. The matrix M[p(b)] manipulation is controlled by reconstruction parameters 31.

Minimum Mean Square Error (MMSE) Prediction for Object/Channel Reconstruction

Although different strategies and methods exist to reconstruct objects or channels from a set of base signals $Z_s[k, b]$, one particular method is often referred to as a minimum mean square error (MMSE) predictor which uses correlations and covariance matrices to derive matrix coefficients M that minimize the L2 norm between a desired and reconstructed signal. For this method, it is assumed that the base signals $z_s[n]$ are generated in the downmixer 24 of the encoder as a linear combination of input object or channel signals $x_i[n]$:

$$z_s[n] = \sum_i g_{i,s} x_i[n]$$

For channel-based input content, the amplitude panning gains $g_{i,s}$ are typically constant, while for object-based content, in which the intended position of an object is provided by time-varying object metadata, the gains $g_{i,s}$ can consequently be time variant. This equation can also be formulated in the transform or sub band domain, in which case a set of gains $g_{i,s}[k]$ is used for every frequency bin/band k, and as such, the gains $g_{i,s}[k]$ can be made frequency variant:

$$Z_s[k, b] = \sum_i g_{i,s}[k] X_i[k, b]$$

The decoder matrix 42, ignoring the decorrelators for now, produces:

$$\begin{bmatrix} \hat{Y}_1[k,b] \\ \vdots \\ \hat{Y}_J[k,b] \end{bmatrix}^T = \begin{bmatrix} Z_1[k,b] \\ \vdots \\ Z_S[k,b] \end{bmatrix}^T M[p(b)]$$

or in matrix formulation, omitting the sub-band index b and parameter band index p for clarity:

$$Y=ZM$$

$$Z=XG$$

The criterion for computing the matrix coefficients M by the encoder is to minimize the mean-square error E which represents the square error between decoder outputs $\hat{Y}_j$ and original input objects/channels $X_j$:

$$E = \sum_{j,k,b} \left(\hat{Y}_j[k,b] - X_j[k,b]\right)^2$$

The matrix coefficients that minimize E are then given in matrix notation by:

$$M=(Z^*Z+\epsilon I)^{-1}Z^*X$$

with epsilon being a regularization constant, and (*) the complex conjugate transpose operator. This operation can be performed for each parameter band p independently, producing a matrix M[p(b)].

Minimum Mean Square Error (MMSE) Prediction for Representation Transformation

Besides reconstruction of objects and/or channels, parametric techniques can be used to transform one representation into another representation. An example of such representation transformation is to convert a stereo mix intended for loudspeaker playback into a binaural representation for headphones, or vice versa.

FIG. 4 illustrates the control flow for a method 50 for one such representation transformation. Object or channel audio is first processed in an encoder 52 by a hybrid Quadrature Mirror Filter analysis bank 54. A loudspeaker rendering matrix G is computed and applied 55 to the object signals $X_i$ stored in storage medium 51 based on the object metadata using amplitude panning techniques, to result in a stereo loudspeaker presentation $Z_s$. This loudspeaker presentation can be encoded with an audio coder 57.

Additionally, a binaural rendering matrix H is generated and applied 58 using an HRTF database 59. This matrix H is used to compute binaural signals $Y_j$ which allow reconstruction of a binaural mix using the stereo loudspeaker mix as input. The matrix coefficients M are encoded by audio encoder 57.

The transmitted information is transmitted from encoder 52 to decoder 53 where it is unpacked 61 to include components M and $Z_s$. If loudspeakers are used as a reproduction system, the loudspeaker presentation is reproduced using channel information $Z_s$ and hence the matrix coefficients M are discarded. For headphone playback, on the other hand, the loudspeaker presentation is first transformed 62 into a binaural presentation by applying the time and frequency-varying matrix M prior to hybrid QMF synthesis and reproduction 60.

If the desired binaural output from matrixing element 62 is written in matrix notation as:

$$Y=XH$$

then the matrix coefficients M can be obtained in encoder 52 by:

$$M=(G^*X^*XG+\epsilon I)^{-1}G^*X^*XH$$

In this application, the coefficients of encoder matrix H applied in 58 are typically complex-valued, e.g. having a delay or phase modification element, to allow reinstatement of inter-aural time differences which are perceptually very relevant for sound source localization on headphones. In other words, the binaural rendering matrix H is complex valued, and therefore the transformation matrix M is complex valued. For perceptually transparent reinstatement of sound source localization cues, it has been shown that a frequency resolution that mimics the frequency resolution of the human auditory system is desired (Breebaart 2010).

In the sections above, a minimum mean-square error criterion is employed to determine the matrix coefficients M. Without loss of generality, other well-known criteria or methods to compute the matrix coefficients can be used similarly to replace or augment the minimum mean-square error principle. For example, the matrix coefficients M can be computed using higher-order error terms, or by minimization of an L1 norm (e.g., least absolute deviation criterion). Furthermore various methods can be employed including non-negative factorization or optimization techniques, non-parametric estimators, maximum-likelihood estimators, and alike. Additionally, the matrix coefficients may be computed using iterative or gradient-descent processes, interpolation methods, heuristic methods, dynamic programming, machine learning, fuzzy optimization, simulated annealing, or closed-form solutions, and analysis-by-synthesis techniques may be used. Last but not least, the matrix coefficient estimation may be constrained in various ways, for example by limiting the range of values, regularization terms, superposition of energy-preservation requirements and alike.

Transform and Filter-Bank Requirements

Depending on the application, and whether objects or channels are to be reconstructed, certain requirements can be superimposed on the transform or filter bank frequency resolution for filter bank unit 41 of FIG. 3. In most practical applications, the frequency resolution is matched to the assumed resolution of the human hearing system to give best perceived audio quality for a given bit rate (determined by the number of parameters) and complexity. It is known that the human auditory system can be thought of as a filter bank with a non-linear frequency resolution. These filters are referred to as critical bands (Zwicker, 1961) and are approximately logarithmic of nature. At low frequencies, the critical bands are less than 100 Hz wide, while at high frequencies, the critical bands can be found to be wider than 1 kHz.

This non-linear behavior can pose challenges when it comes to filter bank design. Transforms and filter banks can be implemented very efficiently using symmetries in their processing structure, provided that the frequency resolution is constant across frequency.

This implies that the transform length, or number of sub-bands will be determined by the critical bandwidth at low frequencies, and mapping of DFT bins onto so-called parameter bands can be employed to mimic a non-linear frequency resolution. Such mapping process is for example explained in Breebaart et al., (2005) and Breebaart et al., (2010). One drawback of this approach is that a very long transform is required to meet the low-frequency critical bandwidth constraint, while the transform is relatively long (or inefficient) at high frequencies. An alternative solution to enhance the frequency resolution at low frequencies is to use a hybrid filter bank structure. In such structure, a cascade of two filter banks is employed, in which the second filter bank enhances the resolution of the first, but only in a few of the lowest sub bands (Schuijers et al., 2004).

FIG. 5 illustrates one form of hybrid filter bank structure 41 similar to that set out in Schuijers et al. The input signal z[n] is first processed by a complex-valued Quadrature Mirror Filter analysis bank (CQMF) 71. Subsequently, the signals are down-sampled by a factor Q e.g. 72 resulting in sub-band signals Z[k, b] with k the sub-band sample index, and b the sub band frequency index. Furthermore, at least one of the resulting sub-band signals is processed by a second (Nyquist) filter bank 74, while the remaining sub-band signals are delayed 75 to compensate for the delay introduced by the Nyquist filter bank. In this particular example, the cascade of filter banks results in 8 sub bands (b=1, . . . , 8) which are mapped onto 6 parameter bands p=(1, . . . , 6) with a non-linear frequency resolution. The bands 76 being merged together to form a single parameter band (p=6).

The benefit of this approach is a lower complexity compared to using a single filter bank with many more (narrower) sub bands. The disadvantage, however, is that the delay of the overall system increases significantly, and consequently, the memory usage is also significantly higher which causes an increase in power consumption.

Limitations of Prior Art

Returning to FIG. 4, it is suggested that the prior art utilises the concept of matrixing 62, possibly augmented with the use of decorrelators, to reconstruct the channels, objects, or presentation signals $\hat{Y}_j$ from a set of base signals $Z_s$. This leads to the following matrix formulation to describe the prior art in a generic way:

$$\begin{bmatrix} \hat{Y}_1[k,b] \\ \vdots \\ \hat{Y}_J[k,b] \end{bmatrix} = \begin{bmatrix} Z_1[k,b] \\ \vdots \\ Z_S[k,b] \\ D_1[k,b] \\ \vdots \\ D_M[k,b] \end{bmatrix}^T M[p(b)]$$

The matrix coefficients M are either transmitted directly from the encoder to decoder, or are derived from sound source localization parameters, for example as described in Breebaart et al 2005 for Parametric Stereo Coding or Herre et al., (2008) for multi-channel decoding. Moreover, this approach can also used to re-instate inter-channel phase differences by using complex-valued matrix coefficients (see Breebaart at al., 2010 and Breebaart, 2005 for example).

As illustrated in FIG. 6, in practice, using complex-valued matrix coefficients implies that a desired delay 80 is represented by a piece-wise constant phase approximation 81. Assuming the desired phase response is a pure delay 80 with a linearly decreasing phase with frequency (dashed line), the prior-art complex-valued matrixing operation results in a piece-wise constant approximation 81 (solid line). The approximation can be improved by increasing the resolution of the matrix M. However, this has two important disadvantages. It requires an increase in the resolution of the filterbank, causing a higher memory usage, higher computational complexity, longer latency, and therefore a higher power consumption. It also requires more parameters to be sent, causing a higher bit rate.

All these disadvantages are especially problematic for mobile and battery powered devices. It would be advantageous if a more optimal solution was available.

SUMMARY OF THE INVENTION

It is an object of the invention, in its preferred form to provide an improved form of encoding and decoding of audio signals for reproduction in different presentations.

In accordance with a first aspect of the present invention, there is provided a method for representing a second presentation of audio channels or objects as a data stream, the method comprising the steps of: (a) providing a set of base signals, the base signals representing a first presentation of the audio channels or objects; (b) providing a set of transformation parameters, the transformation parameters intended to transform the first presentation into the second presentation; the transformation parameters further being specified for at least two frequency bands and including a set of multi-tap convolution matrix parameters for at least one of the frequency bands.

The set of filter coefficients can represent a finite impulse response (FIR) filter. The set of base signals are preferably divided up into a series of temporal segments, and a set of transformation parameters can be provided for each temporal segment. The filter coefficients can include at least one coefficient that can be complex valued. The first or the second presentation can be intended for headphone playback.

In some embodiments, the transformation parameters associated with higher frequencies do not modify the signal phase, while for lower frequencies, the transformation parameters do modify the signal phase. The set of filter coefficients can be preferably operable for processing a multi tap convolution matrix. The set of filter coefficients can be preferably utilized to process a low frequency band.

The set of base signals and the set of transformation parameters are preferably combined to form the data stream. The transformation parameters can include high frequency audio matrix coefficients for matrix manipulation of a high frequency portion of the set of base signals. In some embodiments, for a medium frequency portion of the high frequency portion of the set of base signals, the matrix manipulation preferably can include complex valued transformation parameters.

In accordance with a further aspect of the present invention, there is provided a decoder for decoding an encoded audio signal, the encoded audio signal including: a first presentation including a set of audio base signals intended for reproduction of the audio in a first audio presentation format; and a set of transformation parameters, for transforming the audio base signals in the first presentation format, into a second presentation format, the transformation parameters including at least high frequency audio transformation parameters and low frequency audio transformation parameters, with the low frequency transformation parameters including multi tap convolution matrix parameters, the decoder including: first separation unit for separating the set of audio base signals, and the set of transformation parameters, a matrix multiplication unit for applying the multi tap convolution matrix parameters to low frequency components of the audio base signals; to apply a convolution to the low frequency components, producing convolved low frequency components; and a scalar multiplication unit for applying the high frequency audio transformation parameters to high frequency components of the audio base signals to produce scalar high frequency components; an output filter bank for combining the convolved low frequency components and the scalar high frequency components to produce a time domain output signal in the second presentation format.

The matrix multiplication unit can modify the phase of the low frequency components of the audio base signals. In some embodiments, the multi tap convolution matrix transformation parameters are preferably complex valued. The high frequency audio transformation parameters are also preferably complex-valued. The set of transformation parameters further can comprise real-valued higher frequency audio transformation parameters. In some embodiments the decoder can further include filters for separating the audio base signals into the low frequency components and the high frequency components.

In accordance with a further aspect of the present invention, there is provided a method of decoding an encoded audio signal, the encoded audio signal including: a first presentation including a set of audio base signals intended for reproduction of the audio in a first audio presentation format; and a set of transformation parameters, for transforming the audio base signals in the first presentation format, into a second presentation format, the transformation parameters including at least high frequency audio transformation parameters and low frequency audio transformation parameters, with the low frequency transformation parameters including multi tap convolution matrix parameters, the method including the steps of: convolving low frequency components of the audio base signals with the low frequency transformation parameters to produce convolved low frequency components; multiplying high frequency components of the audio base signals with the high frequency transformation parameters to produce multiplied high frequency components; combining the convolved low frequency components and the multiplied high frequency components to produce output audio signal frequency components for playback over a second presentation format.

In some embodiments, the encoded signal can comprise multiple temporal segments, the method further preferably can include the steps of: interpolating transformation parameters of multiple temporal segments of the encoded signal to produce interpolated transformation parameters, including interpolated low frequency audio transformation parameters; and convolving multiple temporal segments of the low frequency components of the audio base signals with the interpolated low frequency audio transformation parameters to produce multiple temporal segments of the convolved low frequency components.

The set of transformation parameters of the encoded audio signal can be preferably time varying, and the method further preferably can include the steps of: convolving the low frequency components with the low frequency transformation parameters for multiple temporal segments to produce multiple sets of intermediate convolved low frequency components; interpolating the multiple sets of intermediate convolved low frequency components to produce the convolved low frequency components.

The interpolating can utilize an overlap and add method of the multiple sets of intermediate convolved low frequency components.

BRIEF DESCRIPTION OF THE DRAWINGS

Embodiments of the invention will now be described, by way of example only, with reference to the accompanying drawings in which.

REFERENCES

Figure 1:
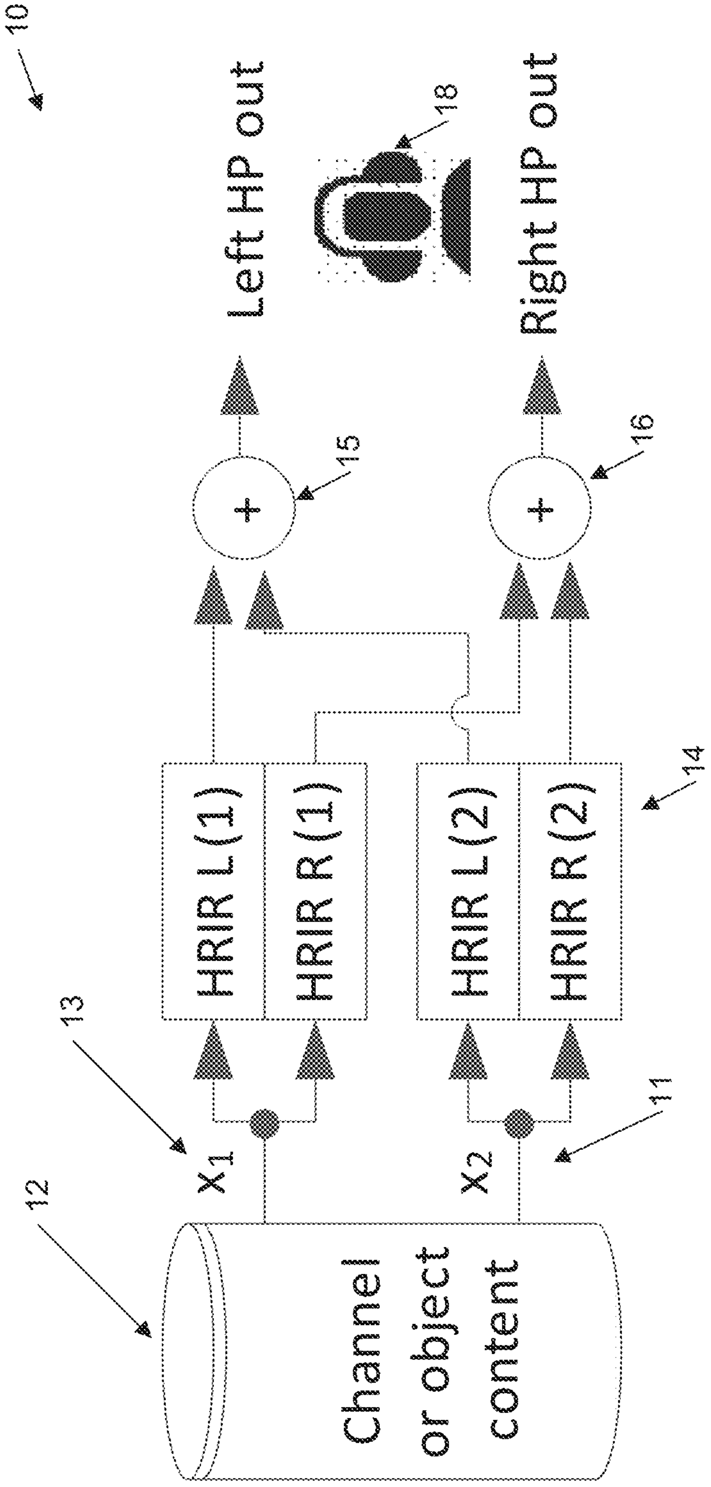
Fig. 1 (Prior Art)
FIG. 1 illustrates a schematic overview of the HRIR convolution process for two sources objects, with each channel or object being processed by a pair of HRIRs/BRIRs.
Figure 2:
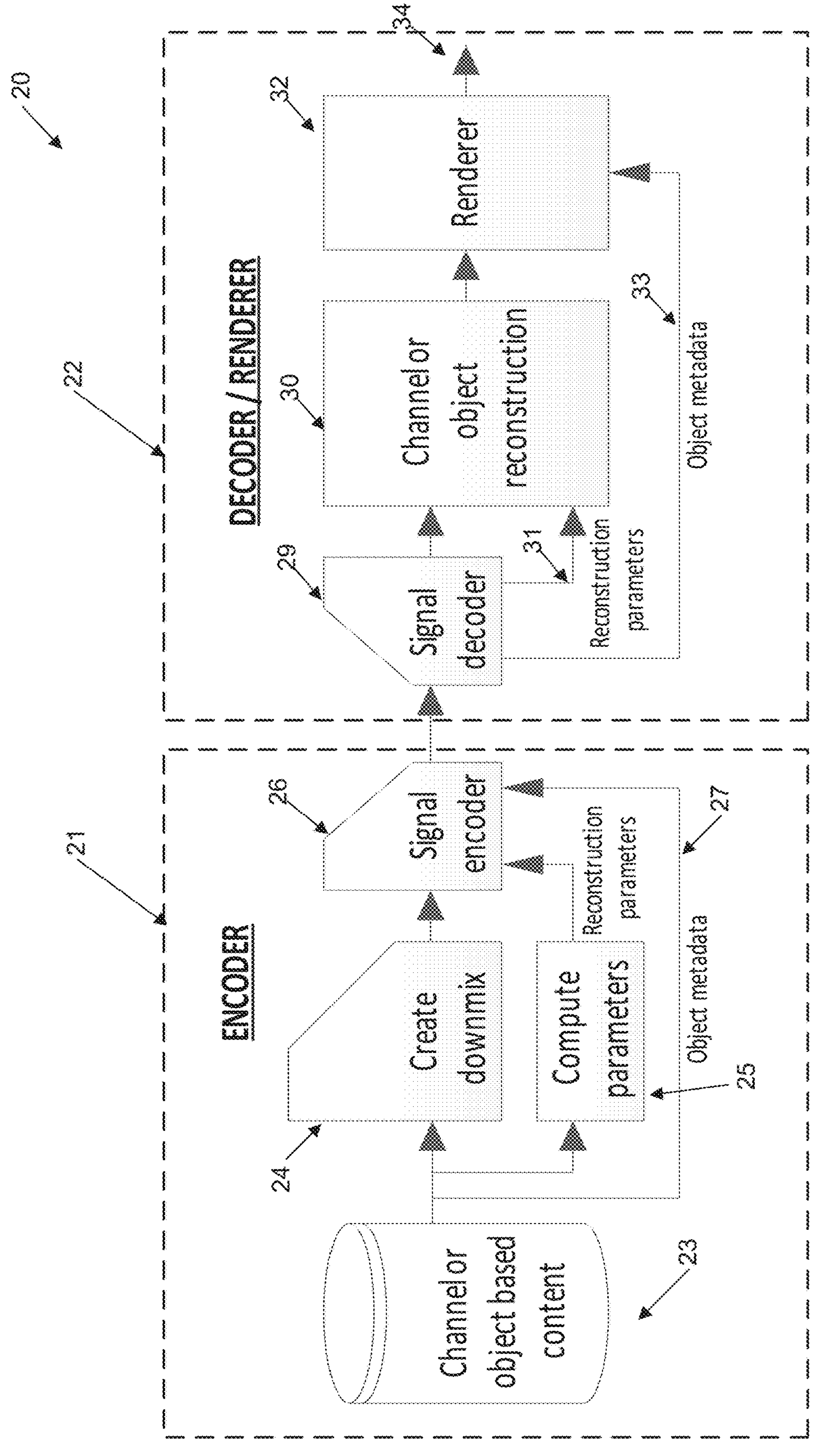
Fig. 2 (Prior Art)
FIG. 2 illustrates schematically a generic parametric coding system supporting channels and objects.
Figure 3:
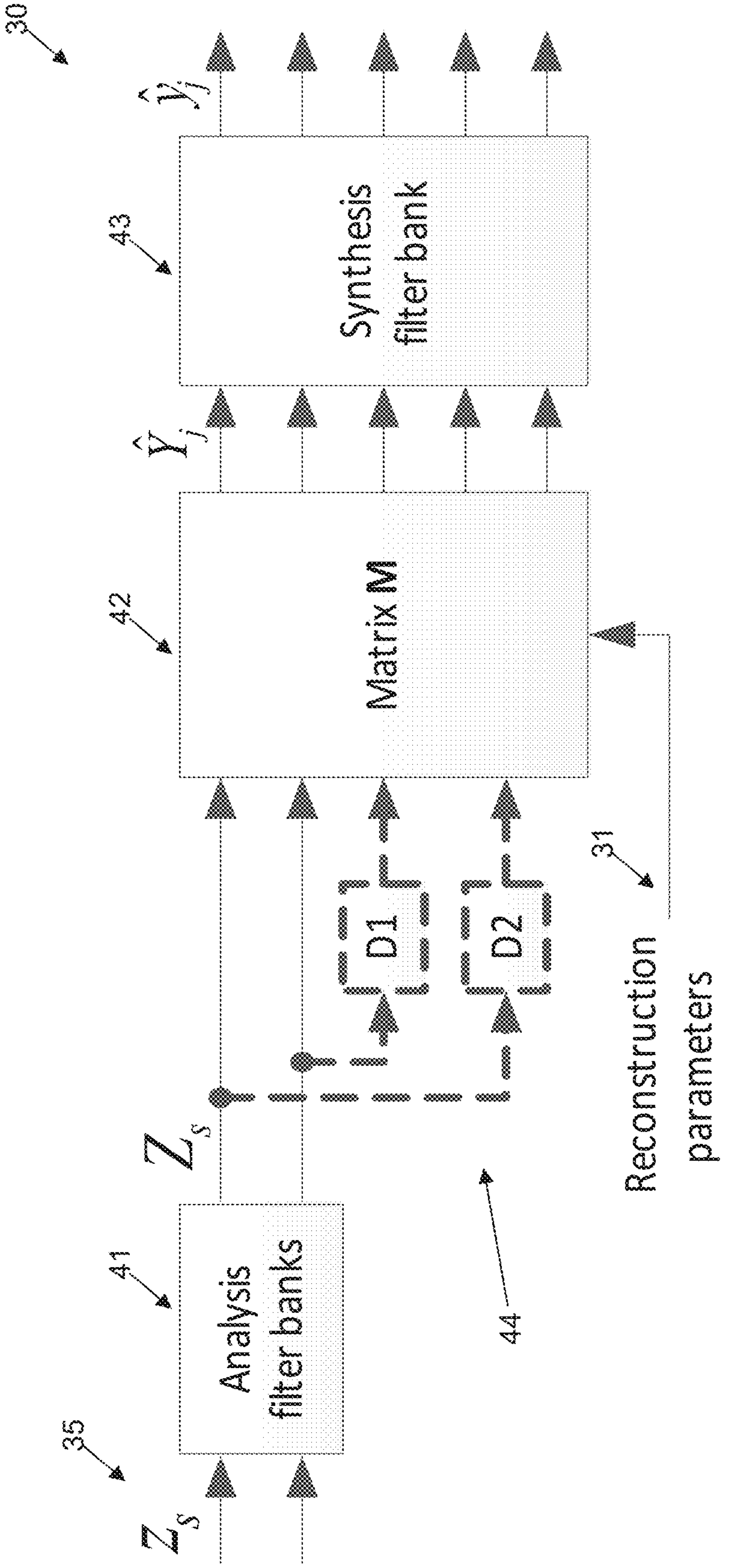
FIG. 3 illustrates schematically one form of channel or object reconstruction unit 30 of FIG. 2 in more detail.
Figure 4:
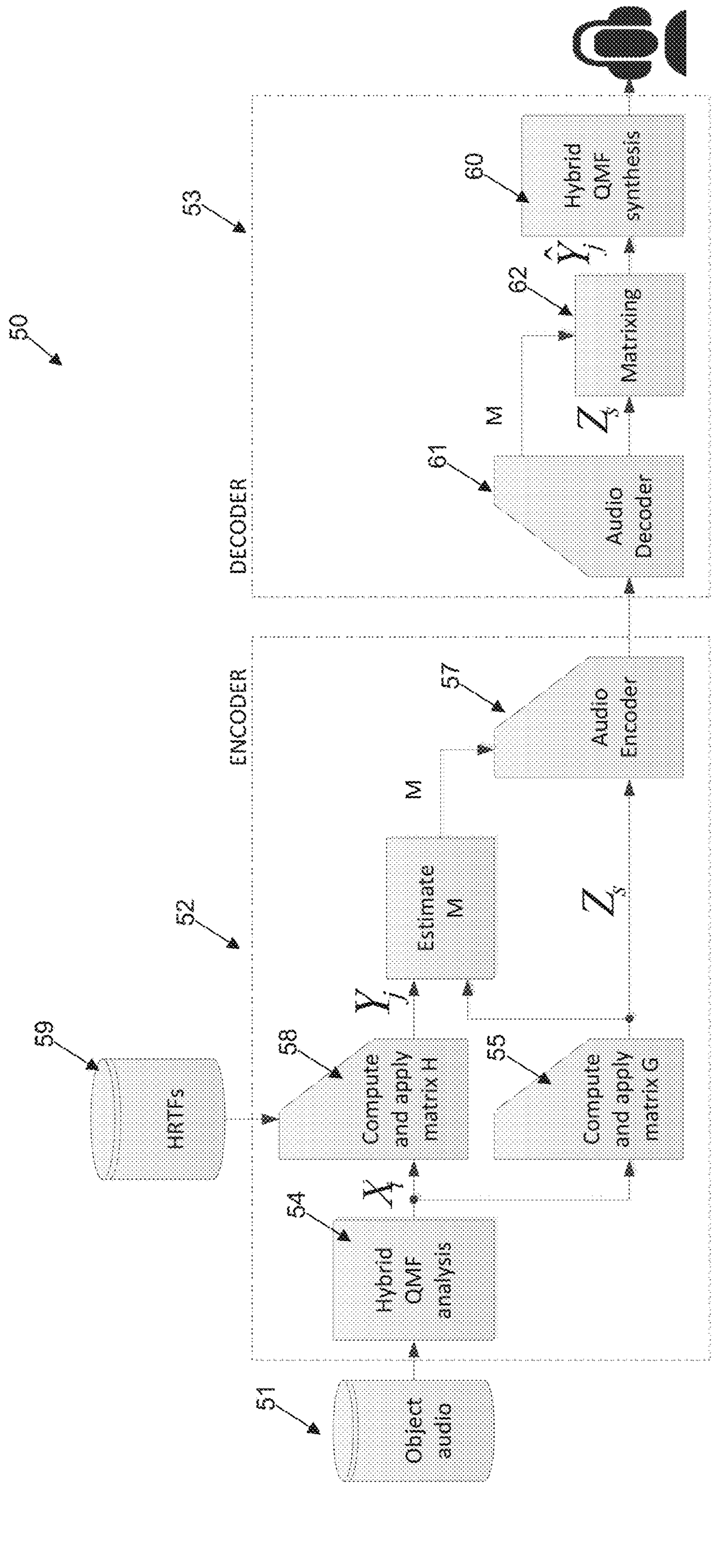
FIG. 4 illustrates the data flow of a method to transform a stereo loudspeaker presentation into a binaural headphones presentation.
Figure 5:
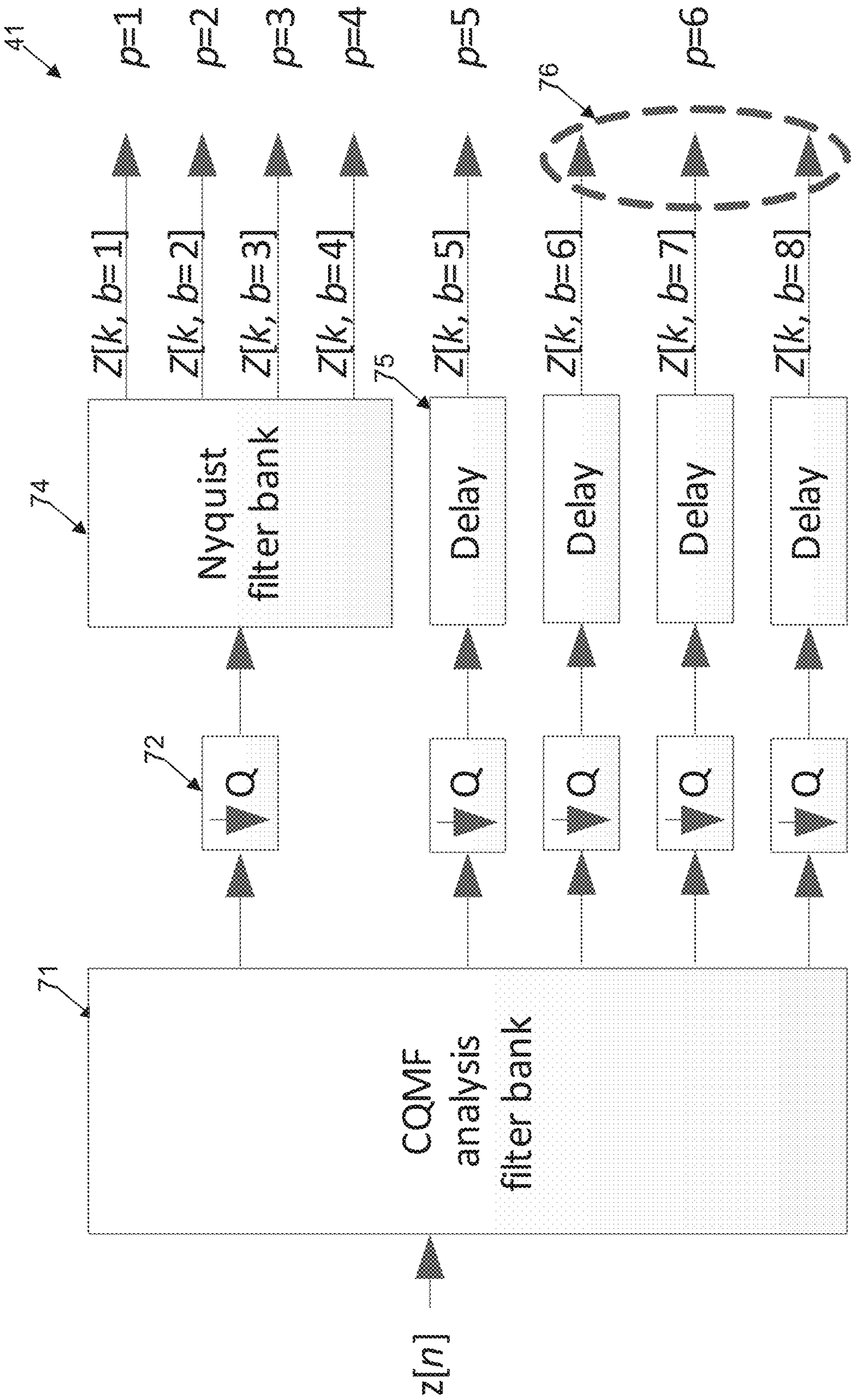
FIG. 5 illustrates schematically the hybrid analysis filter bank structure according to prior art.
Figure 6:
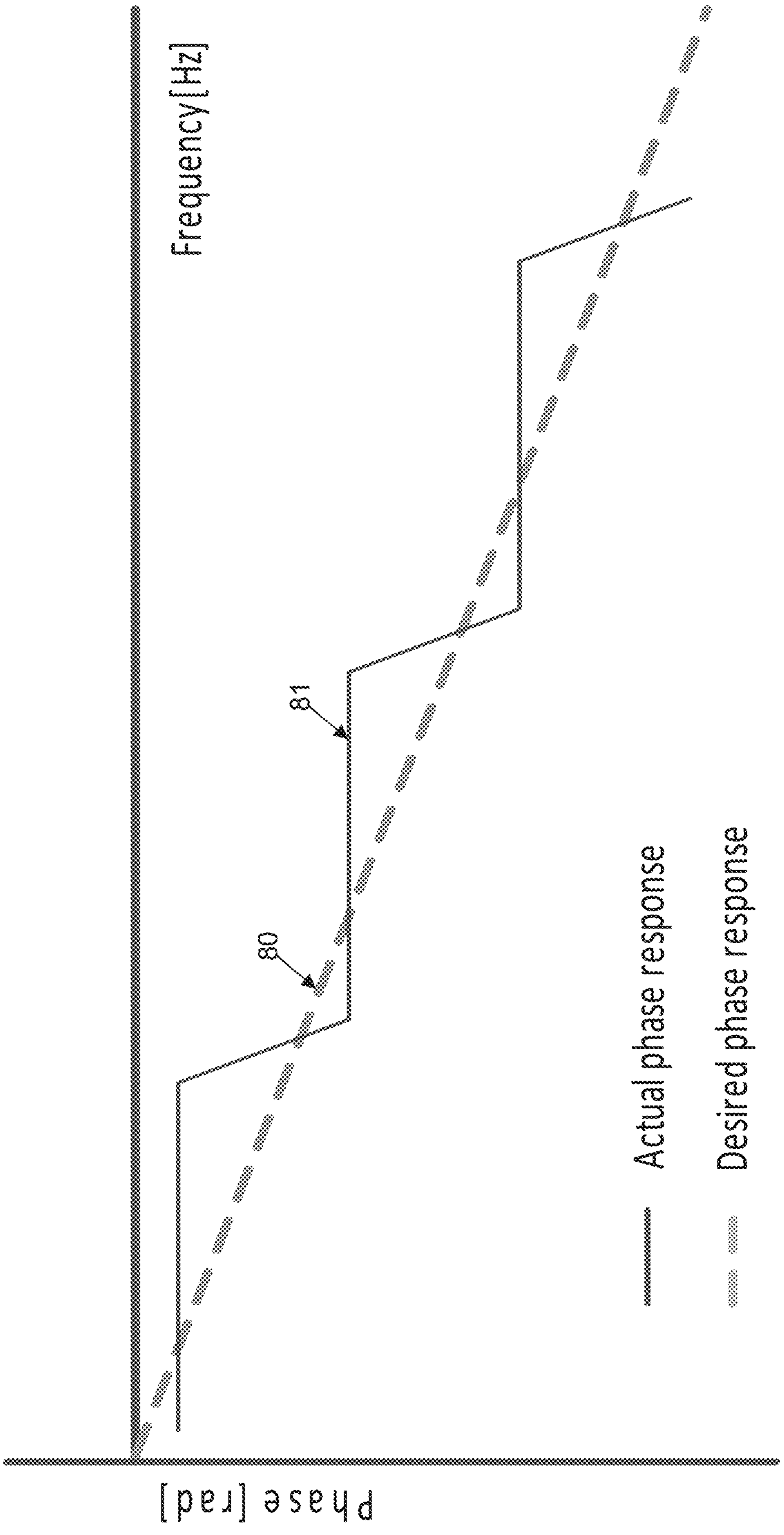
FIG. 6 illustrates a comparison of the desired (dashed line) and actual (solid line) phase response obtained with the prior art.

Wightman, F. L., and Kistler, D. J. (1989). “Headphone simulation of free-field listening. I. Stimulus synthesis,” J. Acoust. Soc. Am. 85, 858-867.

Schuijers, Erik, et al. (2004). “Low complexity parametric stereo coding.” Audio Engineering Society Convention 116. Audio Engineering Society.

Herre, J., Kjörling, K., Breebaart, J., Faller, C., Disch, S., Purnhagen, H., . . . & Chong, K. S. (2008). MPEG surround—the ISO/MPEG standard for efficient and compatible multichannel audio coding. Journal of the Audio Engineering Society, 56(11), 932-955.

Herre, J., Purnhagen, H., Koppens, J., Hellmuth, O., Engdegird, J., Hilpert, J., & Oh, H. O. (2012). MPEG Spatial Audio Object Coding—the ISO/MPEG standard for efficient coding of interactive audio scenes. Journal of the Audio Engineering Society, 60(9), 655-673.

Brandenburg, K., & Stoll, G. (1994). ISO/MPEG-1 audio: A generic standard for coding of high-quality digital audio. Journal of the Audio Engineering Society, 42(10), 780-792.

Bosi, M., Brandenburg, K., Quackenbush, S., Fielder, L., Akagiri, K., Fuchs, H., & Dietz, M. (1997). ISO/IEC MPEG-2 advanced audio coding. Journal of the Audio engineering society, 45(10), 789-814.

Andersen, R. L., Crockett, B. G., Davidson, G. A., Davis, M. F., Fielder, L. D., Turner, S. C., . . . & Williams, P. A. (2004, October). Introduction to Dolby digital plus, an enhancement to the Dolby digital coding system. In Audio Engineering Society Convention 117. Audio Engineering Society.

Zwicker, E. (1961). Subdivision of the audible frequency range into critical bands (Frequenzgruppen). The Journal of the Acoustical Society of America, (33 (2)), 248.

Breebaart, J., van de Par, S., Kohlrausch, A., & Schuijers, E. (2005). Parametric coding of stereo audio. EURASIP Journal on Applied Signal Processing, 2005, 1305-1322.

Breebaart, J., Nater, F., & Kohlrausch, A. (2010). Spectral and spatial parameter resolution requirements for parametric, filter-bank-based HRTF processing. Journal of the Audio Engineering Society, 58(3), 126-140.
Breebaart, J., van de Par, S., Kohlrausch, A., & Schuijers, E. (2005). Parametric coding of stereo audio. EURASIP Journal on Applied Signal Processing, 2005, 1305-1322.

DETAILED DESCRIPTION

This preferred embodiment provides a method to reconstruct objects, channels or 'presentations' from a set of base signals that can be applied in filter banks with a low frequency resolution. One example is the transformation of a stereo presentation into a binaural presentation intended for headphone playback that can be applied without a Nyquist (hybrid) filter bank. The reduced decoder frequency resolution is compensated for by a multi-tap, convolution matrix. This convolution matrix requires only a few taps (e.g. two) and in practical cases, is only required at low frequencies. This method (1) reduces the computational complexity of a decoder, (2) reduces the memory usage of a decoder, and (3) reduces the parameter bit rate.

In the preferred embodiment there is provided a system and method for overcoming the undesirable decoder-side computational complexity and memory requirements. This is implemented by providing a high frequency resolution in an encoder, utilising a constrained (lower) frequency resolution in the decoder (e.g., use a frequency resolution that is significantly worse than the one used in the corresponding encoder), and utilising a multi-tap (convolution) matrix to compensate for the reduced decoder frequency resolution.

Typically, since a high-frequency matrix resolution is only required at low frequencies, the multi-tap (convolution) matrix can be used at low frequencies, while a conventional (stateless) matrix can be used for the remaining (higher) frequencies. In other words, at low frequencies, the matrix represents a set of FIR filters operating on each combination of input and output, while at high frequencies, a stateless matrix is used.

Encoder Filter Bank and Parameter Mapping

Figure 7:
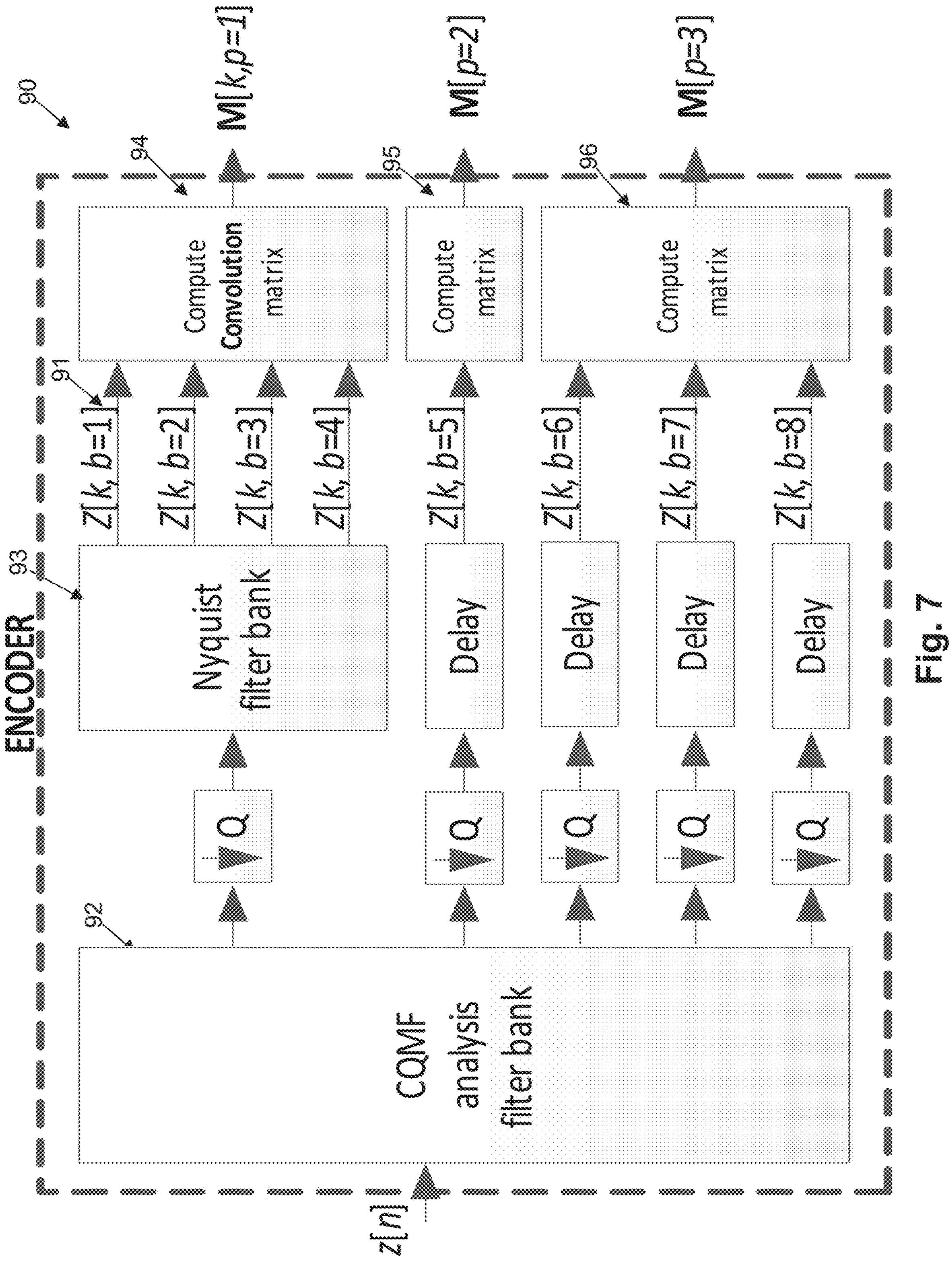
FIG. 7 illustrates schematically an exemplary encoder filter bank and parameter mapping system in accordance with an embodiment of the invention.

FIG. 7 illustrates 90 an exemplary encoder filter bank and parameter mapping system according to an embodiment. In this example embodiment 90, 8 sub bands (b=1, . . . , 8) e.g. 91 are initially generated by means of a hybrid (cascaded) filter bank 92 and Nyquist filter bank 93. Subsequently, the first four sub bands are mapped 94 onto one and the same parameter band (p=1) to compute a convolution matrix M[k, p=1], e.g., the matrix now has an additional index k. The remaining sub bands (b=5, . . . , 8) are mapped onto parameter bands (p=2, 3) using state-less matrices M[p(b)] 95, 96.

Decoder Filter Bank and Parameter Mapping

Figure 8:
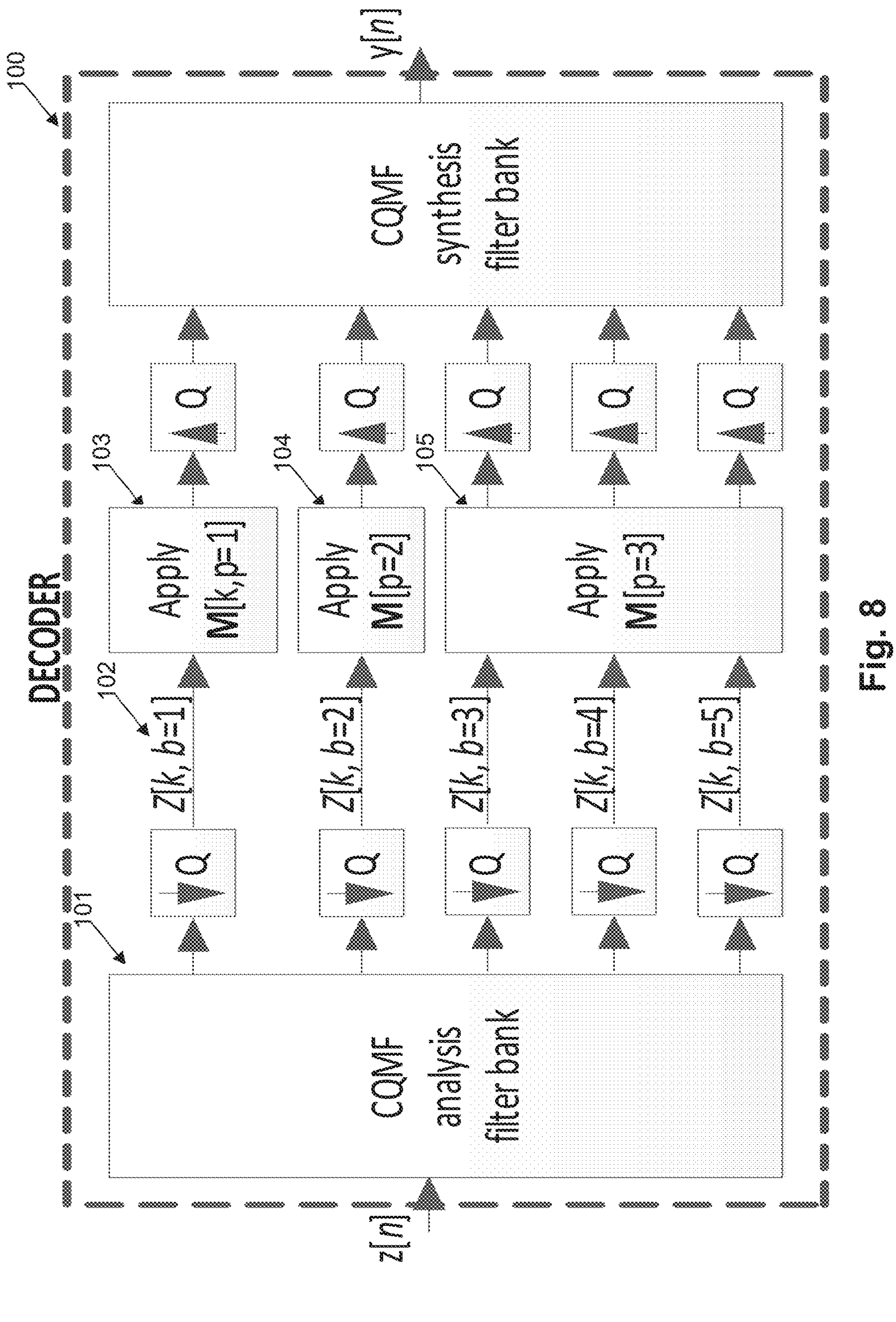
FIG. 8 illustrates schematically the decoder filter bank and parameter mapping according to an embodiment.

FIG. 8 illustrates the corresponding exemplary decoder filter bank and parameter mapping system 100. In contrast to the encoder, no Nyquist filter bank is present, nor are there any delays to compensate for the Nyquist filter bank delay. The decoder analysis filter bank 101 generates only 5 sub bands (b=1, . . . , 5) e.g. 102 that are down sampled by a factor Q. The first sub band is processed by a convolution matrix M[k, p=1] 103, while the remaining bands are processed by stateless matrices 104, 105 according to the prior art.

Although the example above applies a Nyquist filter bank in the encoder 90 and a corresponding convolution matrix for the first CQMF sub band in the decoder 100 only, the same process can be applied to a multitude of sub bands, not necessarily limited to the lowest sub band(s) only.

Encoder Embodiment

Figure 9:
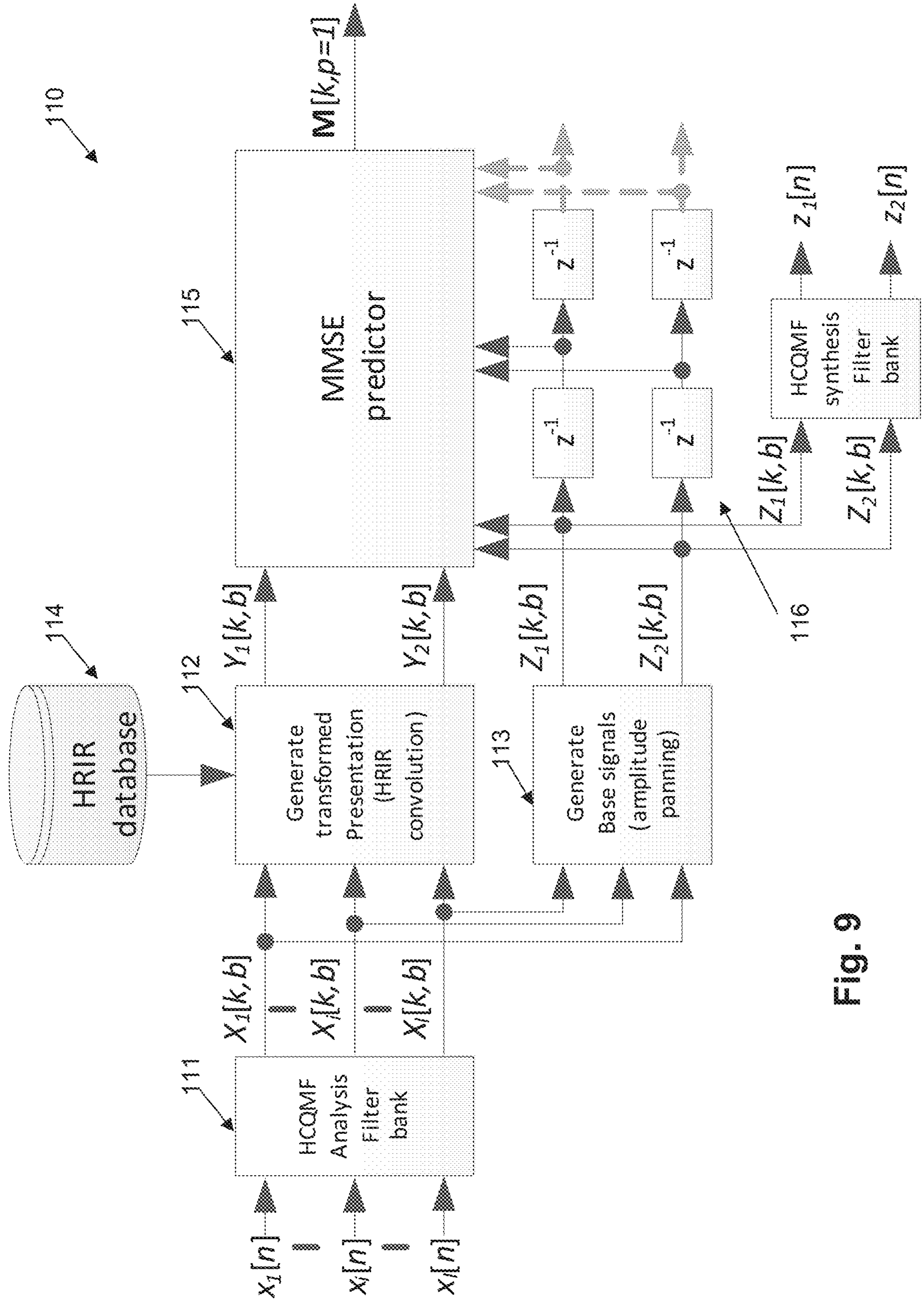
FIG. 9 illustrates an encoder for transformation of stereo to binaural presentations.

One embodiment which is especially useful is in the transformation of a loudspeaker presentation into a binaural presentation. FIG. 9 illustrates an encoder 110 using the proposed method for the presentation transformation. A set of input channels or objects $x_i[n]$ is first transformed using a filter bank 111. The filter bank 111 is a hybrid complex quadrature mirror filter (HCQMF) bank, but other filter bank structures can equally be used. The resulting sub-band representations $X_i[k, b]$ are processed twice 112, 113.

Firstly 113, to generate a set of base signals $Z_s[k, b]$ 113 intended for output of the encoder. This output can, for example, be generated using amplitude panning techniques so that the resulting signals are intended for loudspeaker playback.

Secondly 112, to generate a set of desired transformed signals $Y_j[k, b]$ 112. This output can, for example, be generated using HRIR processing so that the resulting signals are intended for headphone playback. Such HRIR processing may be employed in the filter-bank domain, but can equally be performed in the time domain by means of HRIR convolution. The HRIRs are obtained from a database 114.

The convolution matrix M[k, p] is subsequently obtained by feeding the base signals $Z_s[k, b]$ through a tapped delay line 116. Each of the taps of the delay lines serve as additional inputs to a MMSE predictor stage 115. This MMSE predictor stage computes the convolution matrix M[k, p] that minimizes the error between the desired transformed signals $Y_j[k, b]$ and the output of the decoder 100 of FIG. 8, applying convolution matrices. It then follows that the matrix coefficients M[k, p] are given by:

$$M=(Z^*Z+\epsilon I)^{-1}Z^*Y$$

In this formulation, the matrix Z contains all inputs of the tapped delay lines.

Taking initially the case for the reconstruction of the one signal $\hat{Y}[k]$ for a given sub band b, where there are A inputs from the tapped delay lines, one has:

$$Z=\begin{bmatrix} Z_1[0,b] & \dots & Z_1[-(A-1),b] & Z_S[0,b] & \dots & Z_S[-(A-1),b] \\ \vdots & \ddots & \vdots & \vdots & \ddots & \vdots \\ Z_1[K-1,b] & \dots & Z_1[K-1-(A-1),b] & Z_S[K-1,b] & \dots & Z_S[K-1-(A-1),b] \end{bmatrix}$$

$$Y=\begin{bmatrix} Y_1[0,b] \\ \vdots \\ Y_1[K-1,b] \end{bmatrix}$$

$$M=\begin{bmatrix} m_1[0,b] & \dots & m_S[0,b] \\ \vdots & \ddots & \vdots \\ m_1[A-1,b] & \dots & m_S[A-1,b] \end{bmatrix}=(Z^*Z+\epsilon I)^{-1}Z^*Y$$

The resulting convolution matrix coefficients M[k, p] are quantized, encoded, and transmitted along with the base signals $z_s[n]$. The decoder can then use a convolution process to reconstruct Ŷ[k, b] from input signals $Z_s[k, b]$:

$$\hat{Y}[k, b] = \sum_S Z_S[k, b] * m_S[., b]$$

or written differently using a convolution expression:

$$\hat{Y}[k, b] = \sum_S \sum_{a=0}^{A-1} Z_S[k-a, b] m_S[a, b]$$

The convolution approach can be mixed with a linear (stateless) matrix process.

A further distinction can be made between complex-valued and real-valued stateless matrixing. At low frequencies (typically below 1 kHz), the convolution process (A>1) is preferred to allow accurate reconstruction of inter-channel properties in line with a perceptual frequency scale. At medium frequencies, up to about 2 or 3 kHz, the human hearing system is sensitive to inter-channel phase differences, but does not require a very high frequency resolution for reconstruction of such phase. This implies that a single tap (stateless), complex-valued matrix suffices. For higher frequencies, the human auditory system is virtually insensitive to waveform fine-structure phase, and real-valued, stateless matrixing suffices. With increasing frequencies, the number of filter bank outputs mapped onto a parameter band typically increases to reflect the non-linear frequency resolution of the human auditory system.

In another embodiment, the first and second presentations in the encoder are interchanged, e.g., the first presentation is intended for headphone playback, and the second presentation is intended for loudspeaker playback. In this embodiment, the loudspeaker presentation (second presentation) is generated by applying time-dependent transformation parameters in at least two frequency bands to the first presentation, in which the transformation parameters are further being specified as including a set of filter coefficients for at least one of the frequency bands.

In some embodiments, the first presentation can be temporally divided up into a series of segments, with a separate set of transformation parameters for each segment. In a further refinement, where segment transformation parameters are unavailable, the parameters can be interpolated from previous coefficients.

Decoder Embodiment

Figure 10:
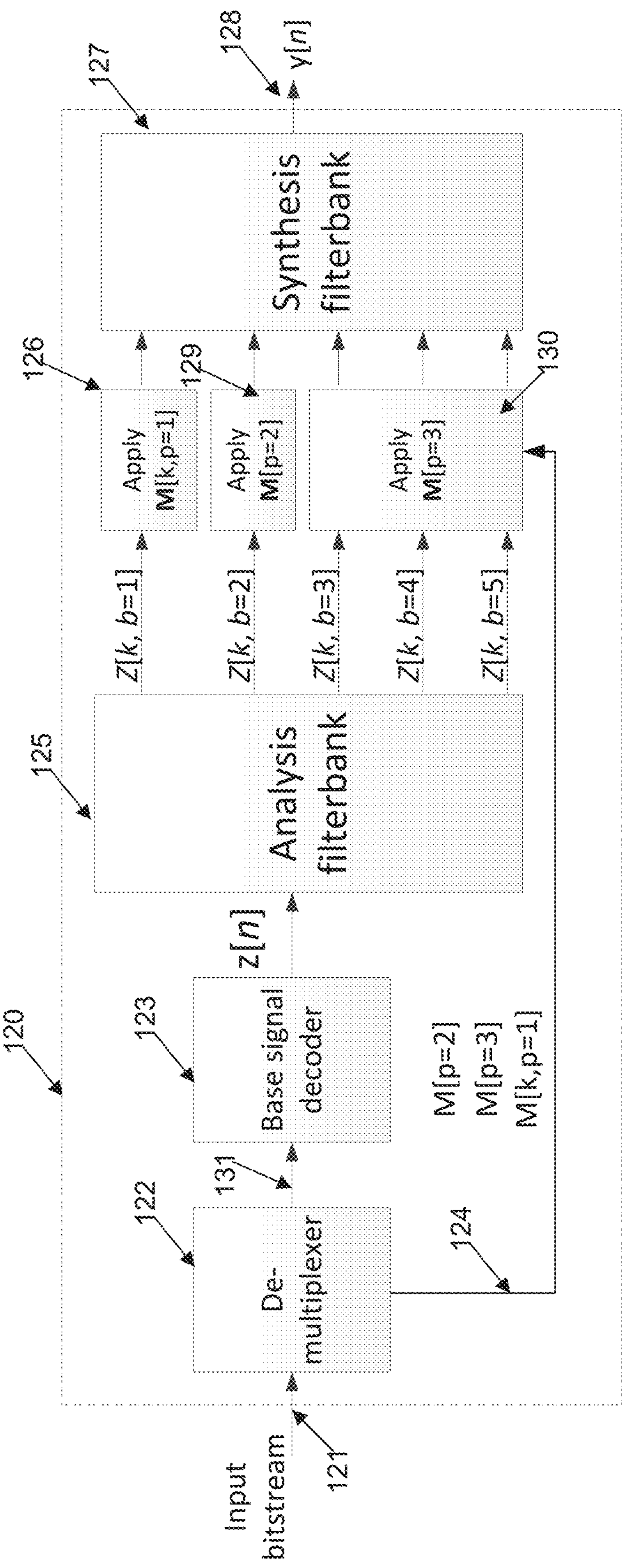
FIG. 10 illustrates schematically a decoder for transformation of stereo to binaural presentations.

FIG. 10 illustrates an embodiment of the decoder 120. Input bitstream 121 is divided into a base signal bit stream 131 and transformation parameter data 124. Subsequently, a base signal decoder 123 decodes the base signals z[n], which are subsequently processed by an analysis filterbank 125. The resulting frequency-domain signals Z[k,b] with sub-band b=1, . . . , 5 are processed by matrix multiplication units 126, 129 and 130. In particular, matrix multiplication unit 126 applies a complex-valued convolution matrix M[k,p=1] to frequency-domain signal Z[k, b=1]. Furthermore, matrix multiplier unit 129 applies complex-valued, single-tap matrix coefficients M[p=2] to signal Z[k, b=2]. Lastly, matrix multiplication unit 130 applies real-valued matrix coefficients M[p=3] to frequency-domain signals Z[k, b=3 . . . 5]. The matrix multiplication unit output signals are converted to time-domain output 128 by means of a synthesis filterbank 127. References to z[n], Z[k], etc. refer to the set of base signals, rather than any specific base signal. Thus, z[n], Z[k], etc. may be interpreted as $z_s[n]$, $Z_s[k]$, etc., where 0≤s<N, and N is the number of base signals.

In other words, matrix multiplication unit 126 determines output samples of sub-band b=1 of an output signal $\hat{Y}_j[k]$ from weighted combinations of current samples of sub-band b=1 of base signals Z[k] and previous samples of sub-band b=1 of base signals Z[k] (e.g., Z[k-a], where 0<a<A, and A is greater than 1). The weights used to determine the output samples of sub-band b=1 of output signal $\hat{Y}_j[k]$ correspond to the complex-valued convolution matrix M[k, p=1] for signal.

Furthermore, matrix multiplier unit 129 determines output samples of sub-band b=2 of output signal $\hat{Y}_j[k]$ from weighted combinations of current samples of sub-band b=2 of base signals Z[k]. The weights used to determine the output samples of sub-band b=2 of output signal $\hat{Y}_j[k]$ correspond to the complex-valued, single-tap matrix coefficients M[p=2].

Finally, matrix multiplier unit 130 determines output samples of sub-bands b=3 . . . 5 of output signal $\hat{Y}_j[k]$ from weighted combinations of current samples of sub-bands b=3 . . . 5 of base signals Z[k]. The weights used to determine output samples of sub-bands b=3 . . . 5 of output signal $\hat{Y}_j[k]$ correspond to the real-valued matrix coefficients M[p=3].

In some cases, the base signal decoder 123 may operate on signals at the same frequency resolution as that provided by analysis filterbank 125. In such cases, base signal decoder 125 may be configured to output frequency-domain signals Z[k] rather than time-domain signals z[n], in which case analysis filterbank 125 may be omitted. Furthermore, in some instances, it may be preferable to apply complex-valued single-tap matrix coefficients, instead of real-valued matrix coefficients, to frequency-domain signals Z[k, b=3 . . . 5].

In practice, the matrix coefficients M can be updated over time; for example by associating individual frames of the base signals with matrix coefficients M. Alternatively, or additionally, matrix coefficients M are augmented with time stamps, which indicate at which time or interval of the base signals z[n] the matrices should be applied. To reduce the transmission bit rate associated with matrix updates, the number of updates is ideally limited, resulting in a time-sparse distribution of matrix updates. Such infrequent updates of matrices requires dedicated processing to ensure smooth transitions from one instance of the matrix to the next. The matrices M may be provided associated with specific time segments (frames) and/or frequency regions of the base signals Z. The decoder may employ a variety of interpolation methods to ensure a smooth transition from subsequent instances of the matrix M over time. One example of such interpolation method is to compute overlapping, windowed frames of the signals Z, and computing a corresponding set of output signals Y for each of such frame using the matrix coefficients M associated with that particular frame. The subsequent frames can then be aggregated using an overlap-add technique providing a smooth cross-faded transition. Alternatively, the decoder may receive time stamps associated with matrices M, which describe the desired matrix coefficients at specific instances in time. For audio samples in-between time stamps, the matrix coefficients of matrix M may be interpolated using linear, cubic, band-limited, or other means for interpolation to ensure smooth transitions. Besides interpolation across time, similar techniques may be used to interpolate matrix coefficients across frequency.

Hence, the present document describes a method (and a corresponding encoder 90) for representing a second presentation of audio channels or objects X; as a data stream that is to be transmitted or provided to a corresponding decoder 100. The method comprises the step of providing base signals $Z_s$, said base signals representing a first presentation of the audio channels or objects $X_i$. As outlined above, the base signals $Z_s$ may be determined from the audio channels or objects $X_i$ using first rendering parameters G (i.e. notably using a first gain matrix, e.g. for amplitude panning). The first presentation may be intended for loudspeaker playback or for headphone playback. On the other hand, the second presentation may be intended for headphone playback or for loudspeaker playback. Hence, a transformation from loudspeaker playback to headphone playback (or vice versa) may be performed.

The method further comprises providing transformation parameters M (notably one or more transformation matrices), said transformation parameters M intended to transform the base signals $Z_s$ of said first presentation into output signals $\hat{Y}_j$ of said second presentation. The transformation parameters may be determined as outlined in the present document. In particular, desired output signals $Y_j$ for the second presentation may be determined from the audio channels or objects $X_i$ using second rendering parameters H (as outlined in the present document). The transform parameters M may be determined by minimizing a deviation of the output signals $\hat{Y}_j$ from the desired output signals $Y_j$ (e.g. using a minimum mean-square error criterion).

Even more particularly, the transform parameters M may be determined in the sub-band-domain (i.e. for different frequency bands). For this purpose, sub-band-domain base signals Z[k,b] may be determined for B frequency bands using an encoder filter bank 92, 93. The number B of frequency bands is greater than one, e.g. B equal to or greater than 4, 6, 8, 10. In the examples described in the present document B=8 or B=5. As outlined above, the encoder filter bank 92, 93 may comprise a hybrid filter bank which provides low frequency bands the B frequency bands having a higher frequency resolution than high frequency bands of the B frequency bands. Furthermore, sub-band-domain desired output signals Y[k,b] for the B frequency bands may be determined. The transform parameters M for one or more frequency bands may be determined by minimizing a deviation of the output signals $\hat{Y}_j$ from the desired output signals $Y_j$ within the one or more frequency bands (e.g. using a minimum mean-square error criterion).

The transformation parameters M may therefore each be specified for at least two frequency bands (notably for B frequency bands). Furthermore, the transformation parameters may include a set of multi-tap convolution matrix parameters for at least one of the frequency bands.

Hence, a method (and a corresponding decoder) for determining output signals of a second presentation of audio channels/objects from base signals of a first presentation of the audio channels/objects is described. The first presentation may be used for loudspeaker playback and the second presentation may be used for headphone playback (or vice versa). The output signals are determined using transformation parameters for different frequency bands, wherein the transformation parameters for at least one of the frequency bands comprises multi-tap convolution matrix parameters. As a result of using multi-tap convolution matrix parameters for at least one of the frequency bands, the computational complexity of a decoder 100 may be reduced, notably by reducing the frequency resolution of a filter bank used by the decoder.

For example, determining an output signal for a first frequency band using multi-tap convolution matrix parameters may comprise determining a current sample of the first frequency band of the output signal as a weighted combination of current, and one or more previous, samples of the first frequency band of the base signals, wherein the weights used to determine the weighted combination correspond to the multi-tap convolution matrix parameters for the first frequency band. One of more of the multi-tap convolution matrix parameters for the first frequency band are typically complex-valued.

Furthermore, determining an output signal for a second frequency band may comprise determining a current sample of the second frequency band of the output signal as a weighted combination of current samples of the second frequency band of the base signals (and not based on previous samples of the second frequency band of the base signals), wherein the weights used to determine the weighted combination correspond to transformation parameters for the second frequency band. The transformation parameters for the second frequency band may be complex-valued, or may alternatively be real-valued.

In particular, the same set of multi-tap convolution matrix parameters may be determined for at least two adjacent frequency bands of the B frequency bands. As illustrated in FIG. 7, a single set of multi-tap convolution matrix parameters may be determined for the frequency bands provided by the Nyquist filter bank (i.e. for the frequency bands having a relatively high frequency resolution). By doing this, the use of a Nyquist filter bank within the decoder 100 may be omitted, thereby reducing the computational complexity of the decoder 100 (while maintaining the quality of the output signals for the second presentation).

Furthermore, the same real-valued transform parameter may be determined for at least two adjacent high frequency bands (as illustrated in the context of FIG. 7). By doing this, the computational complexity of the decoder 100 may be further reduced (while maintaining the quality of the output signals for the second presentation).

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term “exemplary” is used in the sense of providing examples, as opposed to indicating quality. That is, an “exemplary embodiment” is an embodiment provided as an example, as opposed to necessarily being an embodiment of exemplary quality.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms “coupled” and “connected,” along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. “Coupled” may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Various aspects of the present invention may be appreciated from the following enumerated example embodiments (EEESs):

EEE 1. A method for representing a second presentation of audio channels or objects as a data stream, the method comprising the steps of:

(a) providing a set of base signals, said base signals representing a first presentation of the audio channels or objects;

(b) providing a set of transformation parameters, said transformation parameters intended to transform said first presentation into said second presentation; said transformation parameters further being specified for at least two frequency bands and including a set of multi-tap convolution matrix parameters for at least one of the frequency bands.

EEE 2. The method of EEE 1 wherein said set of filter coefficients represent a finite impulse response (FIR) filter.

EEE 3. The method of any previous EEE wherein said set of base signals are divided up into a series of temporal segments, and a set of transformation parameters is provided for each temporal segment.

EEE 4. The method of any previous EEE, in which said filter coefficients include at least one coefficient that is complex valued.

EEE 5. The method of any previous EEE, wherein the first or the second presentation is intended for headphone playback.

EEE 6. The method of any previous EEE wherein the transformation parameters associated with higher frequencies do not modify the signal phase, while for lower frequencies, the transformation parameters do modify the signal phase.

EEE 7. The method of any previous EEE wherein said set of filter coefficients are operable for processing a multi tap convolution matrix.

EEE 8. The method of EEE 7 wherein said set of filter coefficients are utilized to process a low frequency band, EEE 9. The method of any previous EEE wherein said set of base signals and said set of transformation parameters are combined to form said data stream.

EEE 10. The method of any previous EEE wherein said transformation parameters include high frequency audio matrix coefficients for matrix manipulation of a high frequency portion of said set of base signals.

EEE 11. The method of EEE 10 wherein for a medium frequency portion of the high frequency portion of said set of base signals, the matrix manipulation includes complex valued transformation parameters.

EEE 12. A decoder for decoding an encoded audio signal, the encoded audio signal including:

a first presentation including a set of audio base signals intended for reproduction of the audio in a first audio presentation format; and a set of transformation parameters, for transforming said audio base signals in said first presentation format, into a second presentation format, said transformation parameters including at least high frequency audio transformation parameters and low frequency audio transformation parameters, with said low frequency transformation parameters including multi tap convolution matrix parameters, the decoder including:

first separation unit for separating the set of audio base signals, and the set of transformation parameters, a matrix multiplication unit for applying said multi tap convolution matrix parameters to low frequency components of the audio base signals; to apply a convolution to the low frequency components, producing convolved low frequency components; and a scalar multiplication unit for applying said high frequency audio transformation parameters to high frequency components of the audio base signals to produce scalar high frequency components;

an output filter bank for combining said convolved low frequency components and said scalar high frequency components to produce a time domain output signal in said second presentation format.

EEE 13. The decoder of EEE 12 wherein said matrix multiplication unit modifies the phase of the low frequency components of the audio base signals.

EEE 14. The decoder of EEE 12 or 13 wherein said multi tap convolution matrix transformation parameters are complex valued.

EEE 15. The decoder of any one of EEEs 12 to 14, wherein said high frequency audio transformation parameters are complex-valued.

EEE 16. The decoder of EEE 15, wherein said set of transformation parameters further comprises real-valued higher frequency audio transformation parameters.

EEE 17. The decoder of any one of EEEs 12 to 16, further comprising filters for separating the audio base signals into said low frequency components and said high frequency components.

EEE 18. A method of decoding an encoded audio signal, the encoded audio signal including:

a first presentation including a set of audio base signals intended for reproduction of the audio in a first audio presentation format; and a set of transformation parameters, for transforming said audio base signals in said first presentation format, into a second presentation format, said transformation parameters including at least high frequency audio transformation parameters and low frequency audio transformation parameters, with said low frequency transformation parameters including multi tap convolution matrix parameters, the method including the steps of:

convolving low frequency components of the audio base signals with the low frequency transformation parameters to produce convolved low frequency components;

multiplying high frequency components of the audio base signals with the high frequency transformation parameters to produce multiplied high frequency components;

combining said convolved low frequency components and said multiplied high frequency components to produce output audio signal frequency components for playback over a second presentation format.

EEE 19. The method of EEE 18, wherein said encoded signal comprises multiple temporal segments, said method further includes the steps of:

interpolating transformation parameters of multiple temporal segments of the encoded signal to produce interpolated transformation parameters, including interpolated low frequency audio transformation parameters; and convolving multiple temporal segments of the low frequency components of the audio base signals with the interpolated low frequency audio transformation parameters to produce multiple temporal segments of said convolved low frequency components.

EEE 20. The method of EEE 18 wherein the set of transformation parameters of said encoded audio signal are time varying, and said method further includes the steps of:

convolving the low frequency components with the low frequency transformation parameters for multiple temporal segments to produce multiple sets of intermediate convolved low frequency components;

interpolating the multiple sets of intermediate convolved low frequency components to produce said convolved low frequency components.

EEE 21. The method of either EEE 19 or EEE 20 wherein said interpolating utilizes an overlap and add method of the multiple sets of intermediate convolved low frequency components.

EEE 22. The method of any one of EEEs 18-21, further comprising filtering the audio base signals into said low frequency components and said high frequency components.

EEE 23. A computer readable non transitory storage medium including program instructions for the operation of a computer in accordance with the method of any one of EEEs 1 to 11, and 18-22.

What is claimed is:

1. A method of decoding an encoded audio signal, comprising:

receiving, by a decoder, an input bitstream;

dividing the input bitstream into a base signal bitstream and transformation parameter data;

decoding, by a base signal decoder, the base signal bitstream to provide frequency-domain signals having a plurality of subbands;

determining, in response to the transformation parameter data, a complex-valued convolution matrix, complex-valued, single-tap matrix coefficients, and real-valued matrix coefficients;

applying, by a first matrix multiplication unit, the complex-valued convolution matrix to a first subband of the frequency-domain signals;

applying, by a second matrix multiplication unit, the complex-valued, single-tap matrix coefficients to a second subband of the frequency-domain signals;

applying, by a third matrix multiplication unit, the real-valued matrix coefficients to one or more remaining subbands of the frequency-domain signals; and converting, by a synthesis filterbank, output signals from the matrix multiplication units into a time-domain output.

2. A non-transitory computer-readable medium storing instructions that, when executed by a device, cause the device to perform operations comprising:
- receiving, by a decoder, an input bitstream;
- dividing the input bitstream into a base signal bitstream and transformation parameter data;
- decoding, by a base signal decoder, the base signal bitstream to provide frequency-domain signals having a plurality of subbands;
- determining, in response to the transformation parameter data, a complex-valued convolution matrix, complex-valued, single-tap matrix coefficients, and real-valued matrix coefficients;
- applying, by a first matrix multiplication unit, the complex-valued convolution matrix to a first subband of the frequency-domain signals;
  - applying, by a second matrix multiplication unit, the complex-valued, single-tap matrix coefficients to a second subband of the frequency-domain signals;
  - applying, by a third matrix multiplication unit, the real-valued matrix coefficients to one or more remaining subbands of the frequency-domain signals; and
  - converting, by a synthesis filterbank, output signals from the matrix multiplication units into a time-domain output.

3. A system comprising:
- a processor; and
- a non-transitory computer-readable medium storing instructions that, when executed by the processor, cause the processor to perform operations comprising:
  - receiving, by a decoder, an input bitstream;
  - dividing the input bitstream into a base signal bitstream and transformation parameter data;
  - decoding, by a base signal decoder, the base signal bitstream to provide frequency-domain signals having a plurality of subbands;
  - determining, in response to the transformation parameter data, a complex-valued convolution matrix, complex-valued, single-tap matrix coefficients, and real-valued matrix coefficients;
  - applying, by a first matrix multiplication unit, the complex-valued convolution matrix to a first subband of the frequency-domain signals; applying, by a second matrix multiplication unit, the complex-valued, single-tap matrix coefficients to a second subband of the frequency-domain signals; applying, by a third matrix multiplication unit, the real-valued matrix coefficients to one or more remaining subbands of the frequency-domain signals; and converting, by a synthesis filterbank, output signals from the matrix multiplication units into a time-domain output.

* * * * *